June 30, 1931. E. W. DAVIS 1,812,084
PRESSURE LUBRICATION SYSTEM
Filed April 11, 1925 3 Sheets-Sheet 1
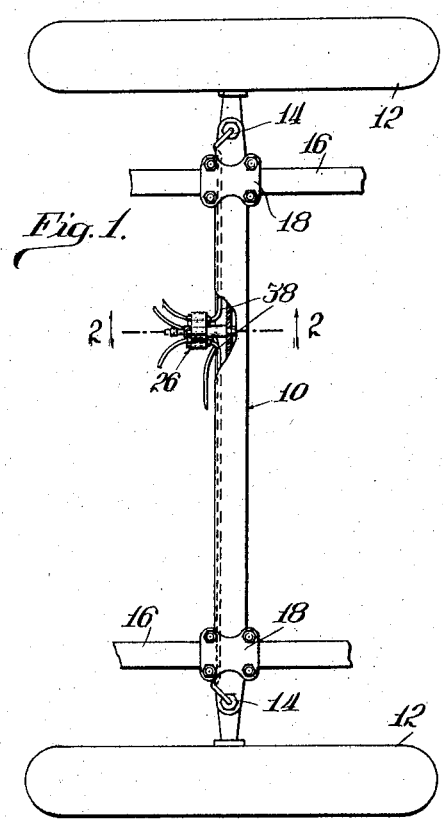
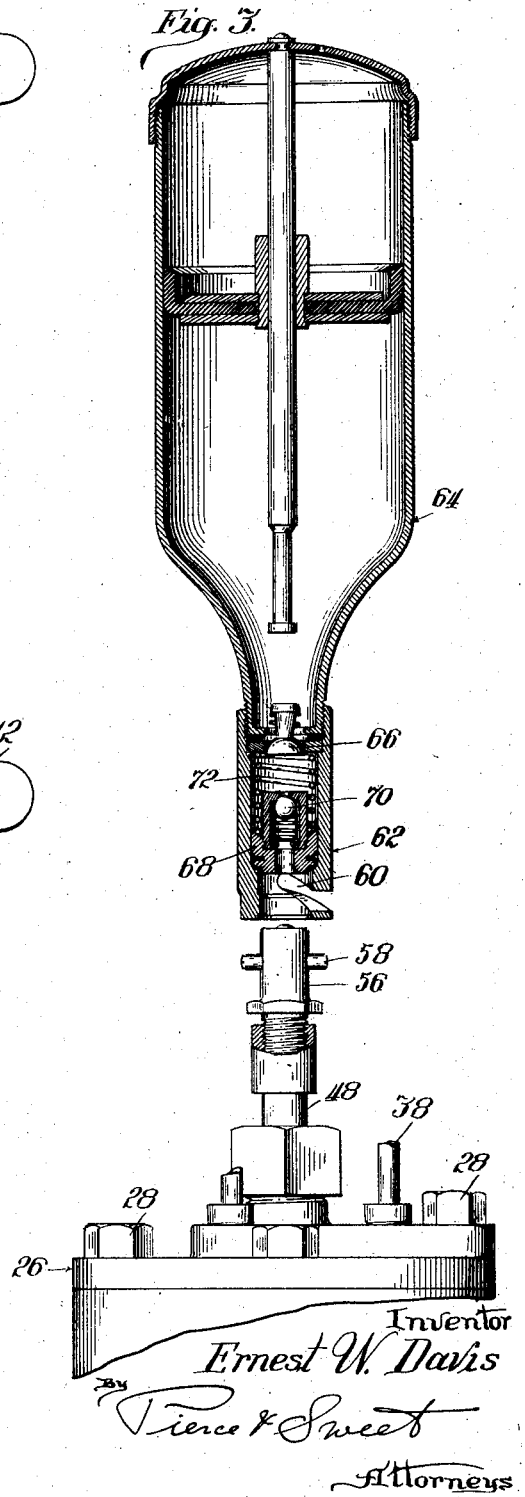
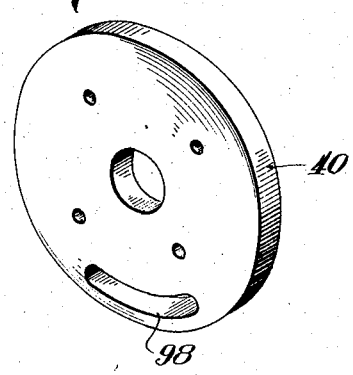
Inventor
Ernest W. Davis
By Pierce & Sweet
Attorneys June 30, 1931.   E. W. DAVIS   1,812,084
PRESSURE LUBRICATION SYSTEM
Filed April 11, 1925   3 Sheets-Sheet 2
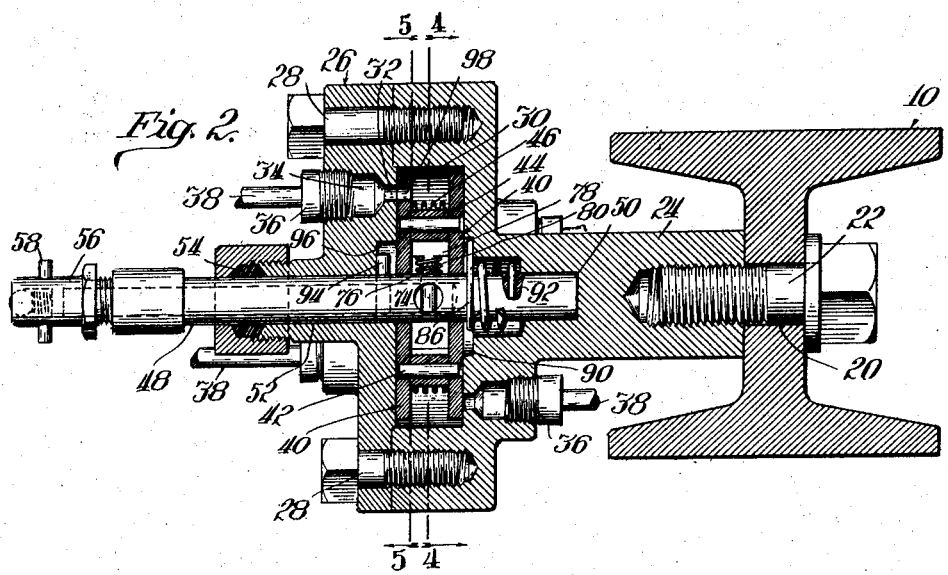
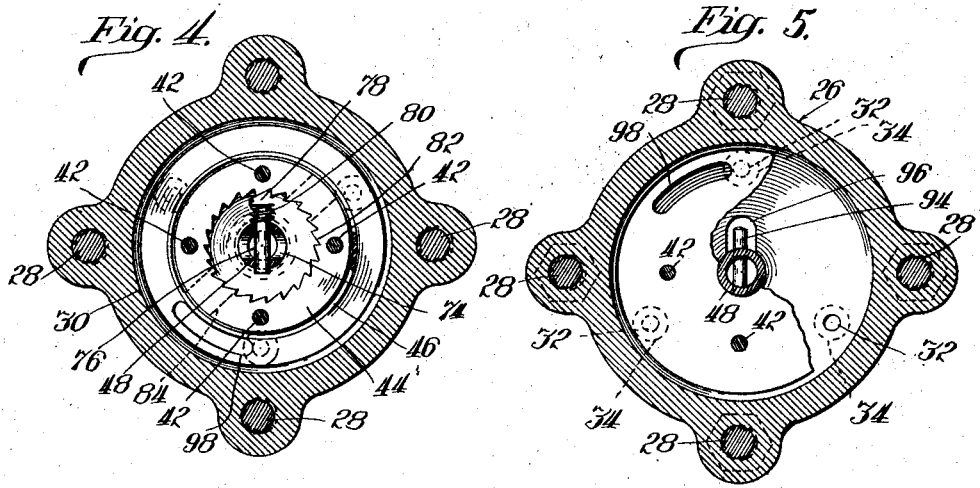
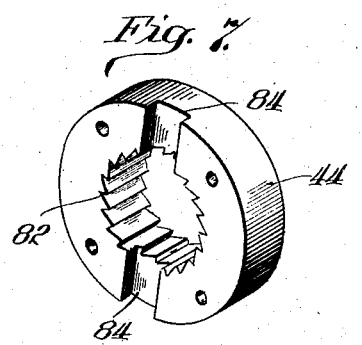
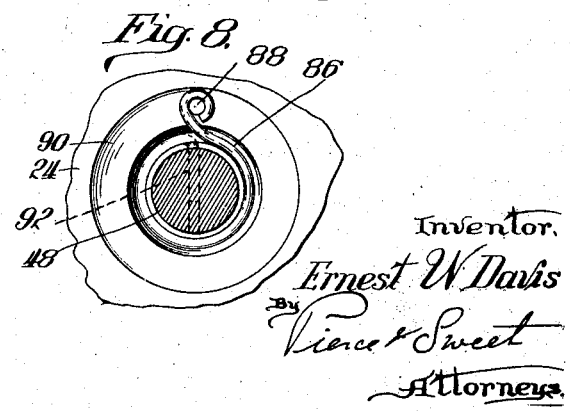
Inventor.
Ernest W. Davis
By Pierce & Sweet
Attorneys.

June 30, 1931. E. W. DAVIS 1,812,084
PRESSURE LUBRICATION SYSTEM
Filed April 11, 1925 3 Sheets-Sheet 3
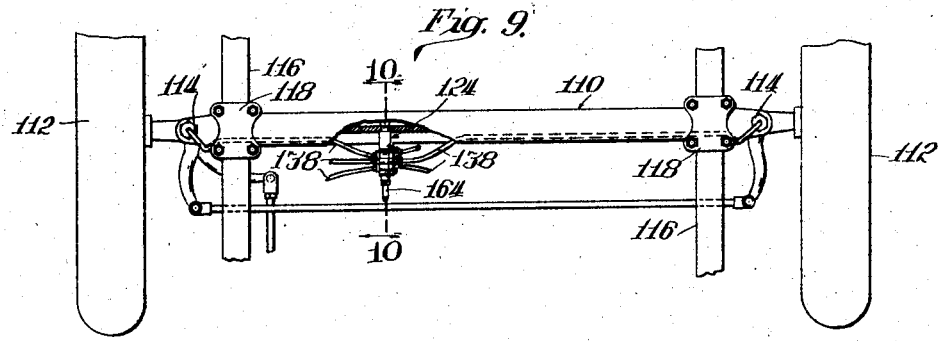
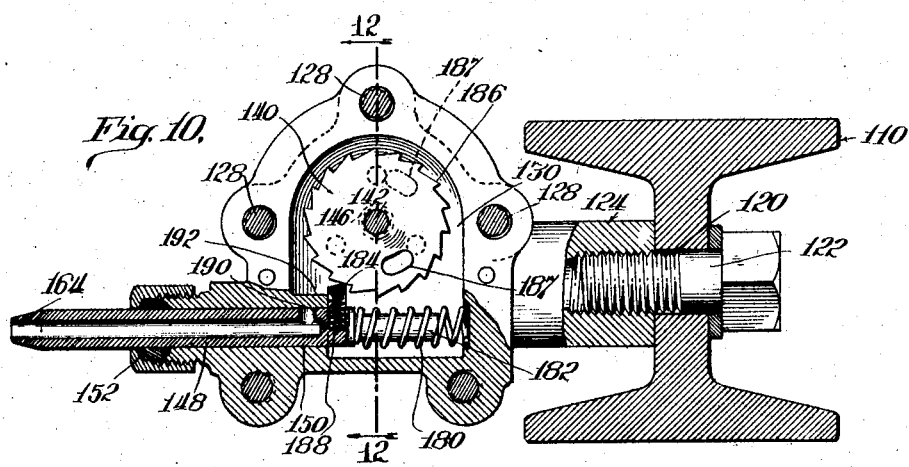
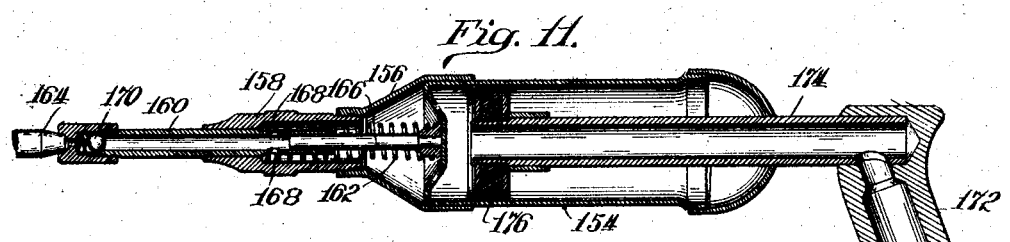
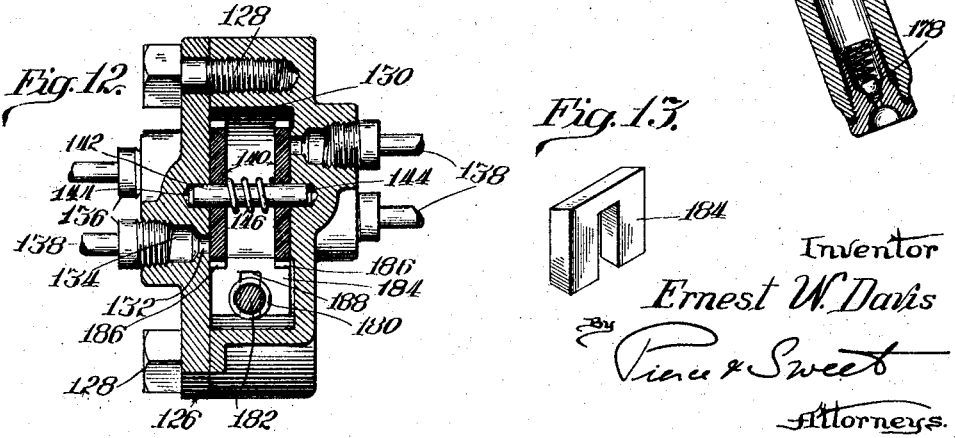
Inventor
Ernest W. Davis
By Pierce & Sweet
Attorneys.

Patented June 30, 1931

1,812,084

UNITED STATES PATENT OFFICE

ERNEST W. DAVIS, OF OAK PARK, ILLINOIS, ASSIGNOR, BY MESNE ASSIGNMENTS, TO ALEMITE CORPORATION, OF CHICAGO, ILLINOIS, A CORPORATION OF DELAWARE

PRESSURE LUBRICATION SYSTEM

Application filed April 11, 1925. Serial No. 22,491.

My invention relates to lubrication and more specifically to an improved system for the convenient and rapid lubrication, in a single operation or series of operations, of a relatively large number of different machine elements associated in the same machine.

Among the objects and advantages of the invention may be enumerated:

First, to provide apportionment means actuated automatically without attention from the operator by the mere use of suitable and usual injection means.

Second, to distribute from a single distribution chamber to a large number of receiving conduits.

Further objects and advantages of my invention will become apparent as the description proceeds.

In the accompanying drawings:

Figure 1 is a plan view of a portion of a piece of machinery indicating the application thereto of a system according to the invention.

Figure 2 is a section through the distributing chamber on line 2—2 of Figure 1.

Figure 3 is a sectional view of a lubricant compressor indicating the mode of applying the same to the structure of Figure 1.

Figure 4 is a section on line 4—4 of Figure 2, looking in the direction of the arrows.

Figure 5 is a section on line 5—5 of Figure 2, looking in the direction of the arrows.

Figure 6 is a perspective view of one of the distributor plates.

Figure 7 is a perspective view of the distributor drive ring.

Figure 8 is a detail section showing the return spring for the inlet tube.

Figure 9 is a plan view of part of a machine to be lubricated indicating the application of another embodiment of the invention thereto.

Figure 10 is a section on line 10—10 of Figure 9.

Figure 11 is a sectional view of a compressor adapted to co-operate with the structure of Figures 9 and 10.

Figure 12 is a section on line 12—12 of Figure 10.

Figure 13 is a perspective view of the pawl for actuating the distributor plates.

In the embodiment of the invention selected for illustration, in Figures 1 to 8 inclusive I have indicated the invention as applied to one axle 10 of an automobile bearing the usual wheels 12 on knuckles pivoted at 14, the axle being connected to the frame by the usual springs 16 fastened to the axle by clips 18. The web of the axle is drilled at 20 to receive a bolt 22 for clamping a body 24 in place. This body comprises a cup shaped head co-operating with a cover 26 held in place by bolts 28 to define a chamber 30. Small openings 32 in the cover 26 are enlarged at 34 to receive the terminals 36 of tubes 38 for conveying lubricant to the various bearings and other parts to be lubricated. Duplicate exit means are provided in the other side of the chamber. The two sets of exit means are staggered to provide, when looked at in plan view parallel to the axis of the chamber, a uniformly spaced series of outlets opening outwardly to the front and to the rear. Distributing plates 40 bear against the opposite sides of the chamber 30 and are inter-connected by a series of pins 42. The pins 42 pass through the periphery of a drive ring 44, and a compression spring 46 encircles the drive ring and holds the plates 40 in contact with the sides of the chamber.

An inlet tube 48 is rotatably mounted at 50 in the body 24 and at 52 in the cover 26 and is provided with a suitable packing means at 54. At its other end it has threaded connection with a check valved inlet fitting 56 having laterally projecting pins 58 for co-operation with inclined slots 60 in the nozzle 62 of a compressor, comprising a barrel 64, and means actuated by movement of the nozzle 62 down over the fitting 56 for forcibly injecting lubricant into the fitting. The compressor illustrated happens to be that described in my co-pending application, Serial No. 694,379, filed February 21, 1924. It comprises, briefly, a stationary intake check valve 66 and a combined seal and piston 68, also provided with a discharge check valve at 70 and held in the position shown in Figure 3 by a compression spring 72. Rotation of the nozzle to slide the slots 60 down over the pins 58 will first effect a seal with the top of the fitting 56 and then force the piston 68 up the sleeve. The intake check valve 66 being closed at this time, lubricant will be forcibly injected into the fitting. Upon the return movement, the spring 72 will move the piston down again, the discharge check valve 70 will close, and the intake check valve 66 will open to permit the cylinder 62 to fill again with lubricant.

The inlet tube 48 is axially bored down to a transverse bore at 74, (see Figure 4). A pawl, comprising a stem 76 and a head 78, is slidably mounted in a suitable transverse bore in the tube 48 and urged radially outward by a coil spring 80, to engage ratchet teeth 82 on the inner periphery of the drive ring 44. To maintain communication between the inside of the drive ring and the chamber 30 surrounding the same, the drive ring is provided with a transverse notch at 84. A torsion spring 86, anchored at 88 in a shallow annulus 90 in the body 24 and entering a transverse bore 92 at its other end, normally keeps the tube 48 in a predetermined position, limited by engagement of a stop pin 94 with one side of a pocket 96 formed in the inner face of the cover 26.

In operation, the torque necessary to inject lubricant will rotate the inlet tube 48, through the displacement permitted by the pin 94, and further rotation of the compressor sleeve 62 will then inject lubricant. On the return stroke the turning force on the tube 48 will be removed and the spring 86 will return the parts to initial position. This rotary reciprocation of the tube 48 will reciprocate the pawl 78 to move the drive ring 44 in step by step movement and rotate the distributing means comprising the drive ring and the plates 40. Each distributing plate 40 is provided with an arcuate slot 98, and the plates are duplicates. The length of the slots 98 is such that as one slot moves away from an outlet opening in the body, the slot in the other plate will simultaneously uncover an outlet in the head. In this way all the outlets are connected, one after another, to the chamber, but no two outlets are open at the same time, and there is no appreciable interval when the chamber 30 has no outlet.

Referring now to the showing of Figures 9 to 13, inclusive, I have illustrated a front axle 110 carrying wheels 112 on knuckles pivoted at 114, the axle being connected to the vehicle by springs 116 fastened thereto by clips 118. The web of the axle 110 is drilled at 120 to receive the fastening bolt 122 for fastening a body 124 in place. The body 124 terminates in a cup shaped head co-operating with a cover 126, fastened in place by bolts 128 to define a chamber 130. The outlet openings 132 are enlarged at 134 to receive the terminals 136 of a plurality of small individual lubricant conduits 138 leading to the various elements to be lubricated. The distributor plates 140 are pivoted on a single central pin 142, received in the alined pockets 144 in the body and cover, and resiliently held in contact with the sides of the chamber by a compression spring 146 encircling the pin.

The inlet tube 148 is slidable in a bore 150 in the body and provided with a suitable packing at 152. It is designed to co-operate with the type of lubricant compressor operated by pressing the compressor against the inlet, such as that illustrated and described in co-pending application Serial No. 726,554, filed July 17, 1924, by Oscar U. Zerk. Such a compressor comprises, briefly, a barrel 154 provided with an extension 156 supporting an end piece 158 in which a discharge tube 160 is slidably mounted. The spring 162 normally presses the tube 160 outwardly to the position shown in Figure 11, but an axial thrust against the receiving terminal 164 will slide the sleeve up over a stationary plunger 166. After the plunger passes the ports 168, the lubricant trapped in the sleeve 160 will be forcibly ejected past a ball valve 170. The axial thrust is developed by force exerted on a handle 172 rigid with a tubular piston rod 174, terminating in a piston 176, and after the pump is empty it may be refilled through the hollow handle 172 and the piston rod 174 by injecting a fresh supply of lubricant past a check valve 178.

Under the axial thrust of the gun the inlet tube 148 will slide in against the force of compression spring 180 until the cylindrical end 182 abuts the far side of chamber 130. This movement accomplishes two things.

First, a yoke 184 straddling the member 148 and constrained to move axially therewith by engagement of its sides in suitable notches in the sides of the inlet tube, engages ratchet teeth 186 formed on the outer periphery of each distributor plate 140 and rotates the distributor plates one notch during the in stroke. On the out stroke the yoke will compress its holding spring 188 sufficiently to slip over the next tooth of the ratchet. In this way the step by step movement of the plates will bring the apertures 187 successively into register with the outlets 132 precisely as in the embodiment of Figure 2.

Second, the axial movement of the inlet tube carries a port 190 past the end of a boss 192 establishing communication with the chamber 130 so that injection of lubricant can occur. On the return stroke the seal is again formed at this point, and no other check valve means is necessary.

Without further elaboration the foregoing will so fully explain the gist of my invention, that others may, by applying current knowledge, readily adapt the same for use under various conditions of service. It will, for instance, be obvious that taking the conduits 38 and 138 from both sides of the chambers instead of one, not only facilitates a compact and convenient arrangement of the conduits to lead directly to the various parts to be lubricated, but substantially doubles the number of outlets that can be provided if desired. Thus, while only three outlets in each side have been shown, the number can be increased up to a limit set by the number of terminals 136 that can be assembled within the dimensions of the device. Many modifications and alterations may readily be made by those skilled in the art without eliminating certain features which may properly be said to constitute the essential items of novelty involved, which items are intended to be defined and secured to me by the following claims.

I claim:

1. Lubricating means comprising a lubricant chamber, a movable inlet thereto, injection means operated by force exerted against said movable inlet, the force necessary to operate said injection means being greater than that necessary to move said inlet, a distributor for the lubricant in said chamber, and connections for step by step actuation of said distributor upon successive movements of said inlet.

2. Lubricating means comprising a lubricant chamber, a movable inlet therefor capable of oscillatory movement relative thereto, injection means operated in one direction by force exerted upon said movable inlet, the force necessary to operate said injection means being greater than that necessary to move said inlet, a distributor for the lubricant in said chamber, and connections for step by step actuation of said distributor upon successive movements of said inlet.

3. Lubricating means comprising a lubricant chamber, a movable inlet thereto, injection means operated by force exerted against said movable inlet, a distributor for the lubricant in said chamber, and connections for step by step actuation of said distributor upon successive movements of said inlet.

4. Lubricating means comprising a lubricant chamber, a movable inlet thereto, injection means conditioned for operativeness upon movement of said inlet, a distributor for the lubricant in said chamber, and connections for step by step actuation of said distributor upon successive movements of said inlet.

5. Lubricating means comprising a lubricant chamber, a movable inlet thereto, a distributor for the lubricant in said chamber, and connections for step by step actuation of said distributor upon successive movements of said inlet.

6. Lubricating means comprising a lubricant chamber, a movable inlet thereto, a plurality of outlets therefrom, a distributor controlling said outlets, and connections for step by step actuation of said distributor upon successive movements of said inlet.

7. Lubricating means comprising, in combination with a mechanism to be lubricated, a receiving chamber supported on said mechanism, a lubricant gun for injecting lubricant into said chamber, distributing means, and rigid, self-contained connections mechanically actuated by said gun upon successive injections of lubricant with said gun for moving said distributing means step by step to connect said chamber with different elements of said mechanism to be lubricated.

8. Lubricating means comprising a receiving chamber, a lubricant gun for injecting lubricant into said chamber, distributing means, and rigid, self-contained connections mechanically actuated by said gun upon successive injections of lubricant with said gun for moving said distributing means.

9. Lubricating means comprising a receiving chamber having an inlet and a plurality of outlets, a portable lubricant gun for injecting lubricant into said chamber, distributing means controlling said outlets, and rigid, self-contained connections actuated by said gun upon successive injections of lubricant with said gun for moving said distributing means.

10. Lubricating means comprising a receiving chamber, a lubricant gun for injecting lubricant into said chamber, rotary distributing means, and rigid, self-contained connections mechanically actuated by said gun upon successive injections of lubricant therefrom for moving said distributing means step by step to connect said chamber with different elements to be lubricated.

11. Lubricating means comprising a receiving chamber, a portable lubricant gun for injecting lubricant into said chamber, rotary distributing means, and rigid self-contained connections mechanically actuated by said gun upon successive lubricant injecting operations of said gun for moving said distributing means step by step to connect said chamber with different elements to be lubricated.

12. Lubricating means comprising a lubricant chamber, an inlet therefor, a pump having a coupling to engage said inlet and operating by relative movement between said inlet and a portion of the pump to compress lubricant, said inlet having limited relative movement with respect to said chamber of the same kind as the movement of the pump required to actuate the pump parts, whereby use of said pump to inject lubricant will reciprocate said inlet, a plurality of outlets from said chamber, distributing plate means movable to uncover said outlets one at a time in series, and pawl and ratchet means connecting said inlet and said distributing plates.

13. Lubricating means comprising a lubricant chamber, an inlet therefor, a pump having a coupling to engage said inlet and operating by relative movement between said coupling and another portion of the pump to compress lubricant, said inlet having limited relative movement with respect to said chamber of the same kind as the relative movement of the pump parts, whereby use of said pump to inject lubricant will reciprocate said inlet, a plurality of outlets from said chamber, means movable to uncover said outlets one at a time in series, and pawl and ratchet means connecting said inlet and said distributing plates.

14. Lubricating means comprising a lubricant chamber, an inlet therefor, a pump having a coupling to engage said inlet and operating by relative movement between such coupling and another portion of the pump to compress lubricant, said inlet having limited relative movement with respect to said chamber of the same kind as the relative movement of the pump parts, whereby use of said pump to inject lubricant will reciprocate said inlet, a plurality of outlets from said chamber, a plurality of distributing plates movable to uncover said outlets one at a time in series, and pawl and ratchet means connecting said inlet and said distributing plates.

15. Lubricating means comprising a lubricant chamber, an inlet therefor, a plurality of outlets from said chamber on opposite sides thereof, opposed distributing plates movable to uncover said outlets one at a time in series, and means mechanically actuated by said gun upon injection of lubricant at said inlet for moving said plates.

16. Lubricant means comprising a lubricant chamber, an inlet therefor, a pump having a coupling to engage said inlet and operating by telescopic movement between such coupling and another portion of the pump to compress lubricant, said inlet having limited telescopic movement with respect to said chamber, a plurality of outlets from said chamber, distributing plate means movable to uncover said outlets one at a time in series, and pawl and ratchet means connecting said inlet and said distributing means for rotating the distributing means upon reciprocation of said inlet.

17. Lubricating means comprising a plurality of conduits converging from points to be lubricated to terminate adjacent each other, unitary distributing means connected to said adjacent ends, manually operable means for injecting lubricant into said distributing means, and rigid connections mechanically operated by said injecting means for actuating said distributing means to apportion the lubricant in predetermined doses to the different conduits.

18. Lubricating means comprising a plurality of conduits converging from points to be lubricated to terminate adjacent each other, unitary distributing means connected to said adjacent ends, a movable inlet to said distributing means, an injection pump shaped to cooperate with said inlet, and means actuated by a single force applied to said pump and transmitted through said movable inlet for injecting lubricant and for moving said distributing means.

19. Lubricating means comprising a receiving chamber, a lubricant gun operating by rotation to inject lubricant into said chamber, rotary distributing means, and connections actuated by said gun upon successive injections of lubricant with said gun for moving said distributing means.

20. Lubricating means comprising a receiving chamber, a lubricant gun operating by rotary reciprocation to inject lubricant into said chamber, distributing means, and connections actuated by said gun upon successive injections of lubricant with said gun for moving said distributing means.

21. Lubricating means comprising a pump having a coupling, a lubricant chamber, a fitting projecting from said chamber and having limited rotary movement, means in said pump actuated by rotation of said coupling on said fitting to compress lubricant, a plurality of outlets from said chamber, distributing plate means movable to uncover said outlets one at a time in series, and pawl and ratchet means connecting said fitting upon said distributing plates.

22. Lubricating means comprising a chamber, a movable inlet thereto, conduits leading from said chamber to points to be lubricated, a distributor controlling communication between said conduits and said chamber, means for supplying lubricant under pressure to said inlet and having a detachable connection with said inlet and operating connections between said inlet and said distributor, said inlet being moved by said lubricant supply means upon injection of lubricant to said chamber for actuating the distributor.

23. Lubricating means comprising a chamber, conduits leading therefrom to the points to be lubricated, a distributor controlling communication between said conduits and said chamber, an inlet for conducting lubricant under pressure to said chamber, means for moving said inlet and for supplying lubricant thereto, and having a detachable connection therewith, and operating connections between said inlet and distributor, actuated by movement of said inlet upon injection of lubricant to said chamber.

24. Lubricating means comprising a chamber, a movable inlet thereto, a plurality of outlets from said chamber, a distributor controlling said outlets, a portable lubricant pressure gun having means for making a lubricant tight connection with said inlet, and operating connections actuated by movement of said inlet under the influence of said lubricant pressure gun upon injection of lubricant into said chamber for operating the distributor.

25. Lubricating means comprising a chamber, an inlet thereto, conduits leading from said chamber to points to be lubricated, a distributor controlling communication between said conduits and said chamber, means for supplying lubricant under pressure to said inlet and having a detachable connection therewith, and rigid mechanical connecting members directly actuated by said lubricant supplying means upon injection of lubricant to said chamber for moving said distributor.

26. Lubricating means comprising a receiving chamber, a lubricant gun operating by reciprocation to inject lubricant into said chamber, rotary distributing means, and rigid, self-contained connections actuated by said gun upon successive lubricant injecting operations thereof rotating said distributing means.

In witness whereof, I hereunto subscribe my name this 31st day of March, 1925.

ERNEST W. DAVIS.